2,813,873
DERIVATIVES OF THE IBOGAINE ALKALOIDS

Maurice-Marie Janot and Robert Goutarel, Paris, France, assignors to Les Laboratoires Gobey, Paris, France, a French body corporate No Drawing. Application October 9, 1956,
Serial No. 614,794

Claims priority, application France October 10, 1955

9 Claims. (Cl. 260—293.4)

This invention relates to a method of obtaining alkaloids and more particularly it relates to a method of obtaining new alkaloids of the general formula shown below:

FORMULA I

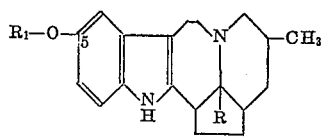

in which R=H, R₁=H or p-toluene-sulfonyl, starting from voacangine, of the general formula cited above wherein R=—CO₂CH₃, R₁=—CH₃.

It is an object of this invention to provide a relatively simple but effective method of producing alkaloids which are useful in industry and in the veterinary and medical arts.

It is a further object of this invention to provide a novel method of obtaining alkaloids from ibogaine, wherein the methyl group of methoxyl in the 5 position of the indole radical has been replaced by hydrogen or by a p-toluene sulfonyl radical, and to a new alkaloid product therefrom.

Another object of the present invention is to provide a method of changing voacangine to ibogaine and of changing alkaliods of iboga to ibogaine.

As the above formula clearly indicates, the alkaloids made according to the present invention are derived from ibogaine $C_{20}H_{24-26}N_2O$, in which R=H, R₁=—CH₃, and wherein the methyl group of methoxy at the 5-position of the indole radical has been replaced by hydrogen or by a p-toluene sulfonyl radical.

While it would appear logical to produce the new derivatives of the invention from ibogaine, the applicants have found that it is much more advantageous and desirable to prepare these derivatives by starting with voacangine as a source. It has been found that voacangine is extracted from the bark of the voacanga tree plant. The voacanga africana, stapf, is able to supply up to 5 grs. per kilo, whereas ibogaine is found in the roots of tabernanthe iboga (H.Bn) at a concentration of 3 grs. per kilo. It is both apparent and obvious that gathering the bark is much easier than gathering the roots, and that the former procedure does not bring about the destruction of the plants. It should also be noted that the voacanga is much more widely prevalent than the iboga.

The process to which this invention relates consists in heating voacangine in alkaline solution in a suitable solvent to a temperature which is preferably close to boiling. It is possible, for instance, to operate on refluxing with methanol potassium. The saponified product is isolated and treated with an acid medium at a temperature between 35 and 55° C., but which is preferably close to 40° C. This treatment causes decarboxylation, and ibogaine hydrochloride is isolated which is transformed into the base ibogaine by methods known per se such as by adding an alkaline solution. Said base ibogaine is then treated by refluxing with a hydrobromic acid solution in acetic acid with a view to demethylating it. After the usual washings, O-demethyl ibogaine is isolated in the form of its hydrochloride, which is isolated, transformed into a base by conventional methods and treated with p-toluene sulfonyl chloride in order to obtain the corresponding p-toluene sulfonate.

It is to be noted that the conversion of voacangine to ibogaine, which has not been described in the past and is very advantageous for the preparation of the alkaloid of iboga, also forms part of the present invention.

It is also possible according to the present invention directly to treat voacangine by refluxing a hydrobromic acid solution of the same in acetic acid and thus directly to isolate O-demethyl ibogaine without being obliged to isolate the intermediate ibogaine.

With the above general features in view, the following examples will serve to illustrate the invention without however restricting the scope of the invention. It is notably possible to change the nature of the solvents, to vary the conditions of temperature, the time of reaction or the order in which the reagents are introduced into the reaction medium, to replace the alkaline or basic agents used by other equivalent ones without thereby exceeding the scope of the invention.

*Example 1.*—The conversion of voacangine [see Formula 1, wherein R=—CO₂CH₃, R₁=—CH₃] into O-demethylibogaine hydrochloride [see Formula I, wherein R=H, R₁=H]

1 gr. of voacangine extracted from voacanga africana stapf and voacanga thouarsii R. and Sch. vr. obtusa (K. Sch.) Pichon (cf. M. M. Janot and R. Goutarel, C. R. 240, 1800 (1955) ) is heated to boiling under nitrogen and in a mixture consisting of 20 cm.³ of crystallizable, glacial, acetic acid and 5 cm.³ of 48% hydrobromic acid. Heating of the mixture is continued for four hours, after which the resultant solution is vacuum evaporated until dry, and the residue is taken up with 200 cm.³ of lukewarm water. The aqueous solution is alkalized with ammonia or any other alkali such as mild NaOH or KOH and extracted three times with 50 cm.³ of ether. The ethereal solution is washed with water, evaporated until dry, and the residue is taken up with 5 cm.³ of methanol or other alcohol such as ethanol, or propanol. The methanol solution is acidified to pH 3 with hydrochloric acid and slowly added to an equal volume of ether. The hydrochloride of O-demethyl-ibogaine is separated in the form of needles which are recrystallized in a 1:1 methanol-ether mixture, then in pure methanol.

The product takes the form of small colorless needles, soluble in water, ethanol and methanol, insoluble in ether and petroleum ether. The crystals melt at 310–312° C. in a capillary tube and have the following characteristic ultraviolet absorption bands:

In alcohol solution: λ=278 mμ; log. ε=3.88
In 0.01 N alcohol potassium: λ=285 mμ; log. ε=3.86.

The displacement of the maximum in an alkaline medium confirms the phenolic nature of O-demethyl-ibogaine. The yield of the above operation is practically quantitative.

The chemical analysis shows the following empirical formula:

$$C_{19}H_{24}ON_2 \cdot HCl$$

As calculated_____ C, 68.6%; H, 7.6%; N, 8.4%
As found_____ C, 68.7%; H, 7.6%; N, 8.5%

This is a new product.

*Example 2.—Conversion of voacangine [see Formula I, wherein R=—CO₂CH₃, R₁=—CH₃] into ibogaine [see Formula I, wherein R=H, R₁=—CH₃]*

500 mg. of voacangine obtained from any suitable source are treated while boiling for six hours in a solution of 4 grs. of potassium in 30 cm.³ of methanol. The solution is vacuum evaporated until dry, then is taken up with 30 cm.³ of water, the aqueous solution is then washed with 20 cm.³ of ether and is acidified to pH 2 with hydrochloric acid. The solution is vacuum evaporated until dry at a temperature of about 40° C.–50° C., and the residue is taken up four times with 100 cm.³ of a (4:1) chloroform-methanol mixture. The potassium chloride is separated by filtration, and the filtrate is vacuum evaporated until dry.

This method above produces 430 mg. of ibogaine hydrochloride which is dissolved in 20 cm.³ of water and re-extracted three times with 10 cm.³ of ether after having alkalized the aqueous solution with sodium bicarbonate, potassium bicarbonate or ammonium bicarbonate or a carbonate thereof. The ethereal solution obtained in this manner is vacuum evaporated until dry, and the residue having been recrystallized in 5 volumes of ethanol produces 350 mg. of pure ibogaine. The characteristics of this compound are: M. P.=150–151° C. by capillary tube test, $[\alpha]_D^{20}=-50\pm2$ (c.=1%, ethanol). The product obtained in this manner is in every respect identical with a genuine sample of the naturally extracted ibogaine. The test of the mixtures produces no depression of the melting point and the values in the ultraviolet and infra-red spectrum agree.

*Example 3.—Conversion of ibogaine into O-dimethyl-libogaine hydrochloride [See Formula I wherein R=H, R₁=H]*

1 gr. of ibogaine prepared according to the preceding example is treated while boiling under nitrogen in a mixture of 20 cm.³ of acetic acid and 5 cm.³ of 48% hydrobromic acid for four hours. The solution is vacuum evaporated until dry, and the residue is taken up with 200 cm.³ of lukewarm water. The aqueous solution is alkalized with ammonia or some similar alkali as herein indicated, and extracted three times, with 50 cm.³ of ether. The ethereal solution obtained in this manner is treated as indicated in Example 1, thereby producing O-demethyl-ibogaine: M. P.=310°–312° C. by capillary tube test.

This product is in every respect identical with the O-demethyl ibogaine described in Example 1. The test of the mixtures produces no depression of the melting point and the values of the spectra are in agreement. The yield from the above conversion is above 95%.

*Example 4.—Passing of O-demethyl-ibogaine hydrochloride to base O-demethyl-ibogaine*

1 gr. of O-demethyl-ibogaine obtained according to the preceding example is dissolved in 100 cm.³ of water, the solution is then cooled to about 5–15° C. and ammonia or other similar basic substance is added drop by drop while stirring until the precipitation is completed. The solution is then separated preferably by centrifugation, washed with water and then vacuum dried thereby producing base O-demethyl-ibogaine with a quantitative yield.

This is a new product which is amorphous, soluble in ethanol and methanol, insoluble in water. Its amphoteric phenolic nature makes it soluble in acid aqueous solutions such as hydrochloric, nitric, sulfuric, phosphoric, boric acid or strong basic solutions such as of KOH, NaOH, LiOH.

*Example 5.—Preparation of O-p-toluene sulfonate of O-demethyl-ibogaine [see Formula I wherein R=H, R₁=CH₃—C₆H₄—SO₂—]*

1 gr. of base O-demethyl-ibogaine prepared according to Example 4 hereinabove is dissolved in 20 cm.³ of anhydrous pyridine, 3 grs. of para-toluene sulfonyl chloride are then added, and the resultant solution is allowed to stand for 2 days at room temperature. The resulting solution is diluted with 200 cm.³ of water and is extracted three times with 50 cm.³ of ether. The ethereal solution is then washed with water, dried over sodium sulfate or similar dehydrating agent and vacuum evaporated until dry. There are produced 1.35 grs. of crude para-toluene sulfonate which are dissolved in 50 cm.³ of benzene or toluol or xylol and chromatographed over 35 grs. of neutral alumina. The benzene washings or eluate, after having been evaporated until dry, is treated with hydrochloric methanol and then crystallized in acetone.

There is produced the hydrochloride of O-demethyl-ibogaine O-para-toluene sulfonate having an M. P.=214–215° C. according to capillary tube technique. The product takes the form of small colorless needles, soluble in water, ethanol and methanol, insoluble in ether and petroleum ether, which have the following maximum ultraviolet absorption:

$$\lambda=285m\mu; \log. \epsilon=3.87$$

The analysis of this product shows the empirical formula of $$C_{26}H_{30}O_3N_2S \cdot HCl$$

As calculated ———————— C, 64.1%; H, 6.4%; N, 5.7%
As found ——————————C, 63.8%; H, 6.6%; N, 5.7%

The products or new alkaloids made according to the present invention are valuable in the medical and veterinary art for medical and therapeutic purposes, and in industry as intermediates for the development of finished products.

The new products of the present invention are characterized by their excellent and effective cardio-tonic and general tonic properties and which are combined with a remarkably low toxicity on the human being and other animals. Also they can be used as intermediate products in the preparation of other compounds of an alkaloidal nature.

In the description and examples it is to be noted that where a basic material as ammonia is mentioned such term includes the bases such as NaOH, KOH, and the like.

As to solvents, there are included methanol, ethanol and propanol.

Ethereal solutions may be ether, chloroform, acetone and the like.

Throughout the specification it is to be noted that the term "demethyl" is to be construed as meaning demethylated, i. e., wherein the methyl radical is removed from the molecule of the compound.

While preferred methods of the invention have been described, it is to be understood that various modifications may be made as to steps of procedure and use of agents, materials, diluents, solvents, extractives, without departing from the spirit and scope of the invention.

We claim:

1. The method of producing new alkaloids of the general Formula I:

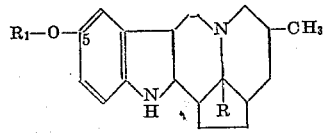

wherein R=H, R₁=H or p-toluene sulfonyl, comprising heating voacangine in an alkaline solution in a solvent selected from the group consisting of methanol, ethanol, and propanol at a temperature which is preferably close to boiling, isolating the resultant saponified product, then treating in an acid medium at a temperature between 35°–55° C. forming ibogaine hydrochloride, then isolating said ibogaine hydrochloride, then converting into base ibogaine, treating said base by refluxing with a hydrobromic acid solution in acetic acid so as to obtain O-demethyl-ibogaine hydrochloride, then isolating the latter product and then converting into a base by conventional methods, then treating with p-toluene-sulfonyl chloride so as to produce the corresponding p-toluene sulfonate.

2. The method according to claim 1 wherein the voacangine is directly treated by refluxing with a hydrobromic acid solution in acetic acid so as to obtain, after the usual washings, O-demethyl-ibogaine hydrochloride, then isolating and converting into a base and treating with p-toluene sulfonyl chloride so as to produce the corresponding p-toluene-sulfonate, the intermediate ibogaine not being isolated.

3. The process according to claim 1 wherein the saponification of voacangine is carried out with methanol potassium.

4. The process according to claim 1 wherein the saponified product is decarboxylated by heating to between 35°–55° C. in N hydrochloric acid.

5. The method of producing ibogaine which consists in heating a substance containing voacangine in a lower alcohol alkaline solution at a temperature approximating boiling, then heating with an acid medium at a temperature between 35°–55° C., then converting the resultant ibogaine hydrochloride into a base ibogaine, refluxing the last named product with a hydrohalogen acid in the presence of an acid to demethylate said product, washing to isolate O-demethyl ibogaine hydrochloride, alkalinizing said last product then treating with p-toluene sulfonyl chloride to obtain the corresponding p-toluene sulfonate.

6. As a new product, O-demethyl-ibogaine hydrochloride.

7. As a new product, O-demethyl-ibogaine.

8. As a new product, O-p-toluene sulfonate hydrochloride of O-demethyl-ibogaine.

9. As a new product, O-p-toluene-sulfonate of O-demethyl-ibogaine.

No references cited.